US009010472B2

(12) United States Patent
Meszaros et al.

(10) Patent No.: US 9,010,472 B2
(45) Date of Patent: *Apr. 21, 2015

(54) PARKING BRAKE NESTED FOOTREST ASSEMBLY

(71) Applicant: Ford Global Technologies, LLC, Dearborn, MI (US)

(72) Inventors: Edward Joseph Leonard Meszaros, Amhesrtburg (CA); William Edward Draper, Canton, MI (US); David Thomas Patrick, Canton, MI (US); Keith Brown, Riverview, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/838,894

(22) Filed: Mar. 15, 2013

(65) Prior Publication Data

US 2014/0265509 A1    Sep. 18, 2014

(51) Int. Cl.
*B60N 3/06*    (2006.01)
*B60T 7/06*    (2006.01)
*B60T 7/04*    (2006.01)
*G05G 1/60*    (2008.04)

(52) U.S. Cl.
CPC ... *B60N 3/06* (2013.01); *B60T 7/04* (2013.01); *B60T 7/045* (2013.01); *B60T 7/06* (2013.01); *G05G 1/60* (2013.01)

(58) Field of Classification Search
CPC .............. B60N 3/06; G05G 1/60; B60T 7/06
USPC ........................ 180/90.6; 296/75; 74/564, 512
See application file for complete search history.

(56) References Cited

U.S. PATENT DOCUMENTS

| 3,047,088 | A | 7/1962 | Murrell |
| 6,179,079 | B1 | 1/2001 | Basnett |
| 7,896,421 | B2 * | 3/2011 | Kosuge et al. .................. 296/75 |
| 8,459,718 | B2 * | 6/2013 | Pehler ......................... 296/97.23 |
| 2010/0152352 | A1 * | 6/2010 | Barber et al. ................. 524/296 |
| 2010/0230990 | A1 * | 9/2010 | Shukuri et al. .................. 296/75 |
| 2014/0210227 | A1 * | 7/2014 | Meszaros et al. ............... 296/75 |

FOREIGN PATENT DOCUMENTS

| GB | 191405608 | * | 0/1915 | .............. G05G 1/01 |
| JP | 9091053 | A | 4/1997 | |
| WO | 2010112758 | | 10/2010 | |

OTHER PUBLICATIONS

Website printout from CARiD entitled "Street Design Foot Rest".

* cited by examiner

*Primary Examiner* — Keith Frisby
(74) *Attorney, Agent, or Firm* — Vichit Chea; Price Heneveld LLP

(57) ABSTRACT

A footrest assembly includes a body portion having an upper contact surface adapted to support a vehicle occupant's foot at a predetermined angle. The footrest assembly includes mounting members adapted to couple the footrest assembly to a base unit disposed on a vehicle floorboard. The footrest assembly includes a depression or recess adapted to receive a parking brake pedal when the parking brake is in a fully actuated position. Thus, the footrest assembly is configured to provide a footrest option in a vehicle interior that would otherwise not have the space requirements to accommodate a footrest, while also allowing for full functionality of a parking brake pedal.

11 Claims, 5 Drawing Sheets

US 9,010,472 B2

PARKING BRAKE NESTED FOOTREST ASSEMBLY

FIELD OF THE INVENTION

The present invention generally relates to a footrest assembly for use in a vehicle interior on a floorboard, and more specifically, to a footrest assembly having a molded-in pocket adapted to nest the pedal of a parking brake as actuated by a vehicle occupant.

BACKGROUND OF THE INVENTION

Footrest assemblies are generally installed on a vehicle floorboard in a vehicle interior on the driver's side of the vehicle interior. These footrest assemblies generally include a static or fixed position that does not vary according to the vehicle occupant's preference. In an occupant compartment disposed in a vehicle interior, an open floorboard is generally preferred as compared to one constrained by a fixed footrest, as the driver's side architecture of a parking brake pedal and its execution path can make a footrest option impractical.

The present invention provides a footrest assembly which provides a molded-in pocket to accommodate a parking brake pedal, thereby allowing for full actuation of the parking brake pedal while still providing the vehicle occupant with a footrest option. Further, the present invention provides a footrest assembly which can be easily installed on a carryover vehicle.

SUMMARY OF THE INVENTION

One aspect of the present invention includes a footrest assembly for use in a vehicle compartment, wherein the vehicle compartment includes a pedal assembly. The footrest assembly includes an upper contact surface disposed at a predetermined angle relative to a floorboard, and further includes a recess disposed thereon. The recess is defined by a plurality of angled walls configured to gravitationally drain elements from the recess as deposited therein in use. The recess is further adapted to receive the pedal, when the pedal is in a full actuated position.

Another aspect of the present invention includes the footrest assembly for use in a vehicle compartment, wherein the vehicle compartment includes a pedal assembly. The footrest assembly includes an upper contact surface and a liner member removeably supported on the upper contact surface. A recess is disposed on the liner, wherein the recess is defined by a plurality of angled walls which are configured to gravitationally drain debris from the recess. The recess is adapted to receive the pedal when the pedal is in an actuated position.

Yet another aspect of the present invention includes a footrest assembly for use in a vehicle compartment, wherein the vehicle compartment includes an actuating pedal. The footrest assembly includes an upper contact surface having a recess disposed thereon. The recess is configured to gravitationally expel debris from the recess. A plurality of raised contact pads are adapted to at least partially conceal the recess as disposed on the upper contact surface. The recess is adapted to receive the pedal when the pedal is in the actuated position.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
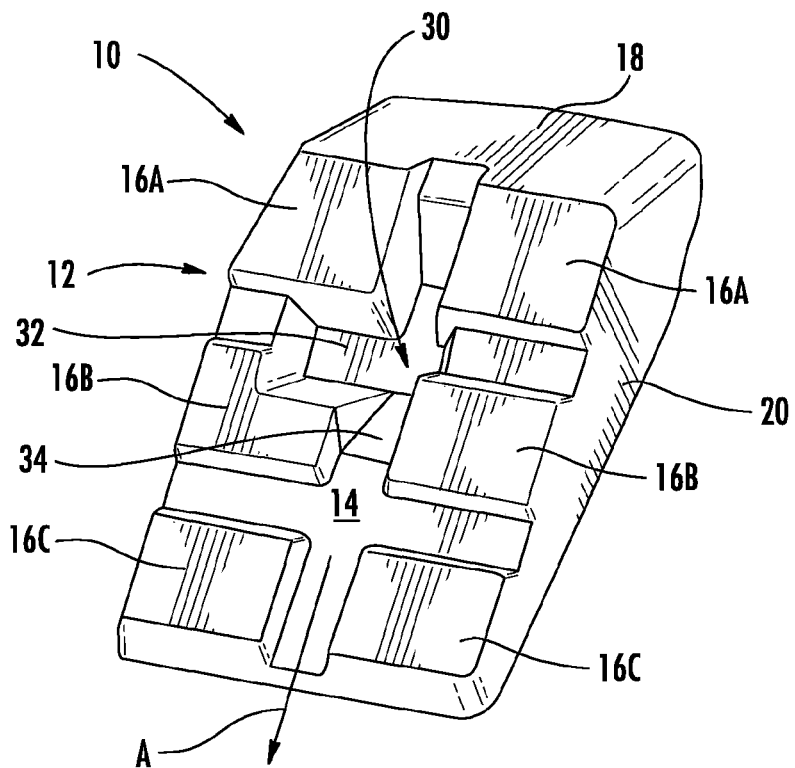
FIG. 1 is a front perspective view of a foot rest assembly according to one embodiment of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
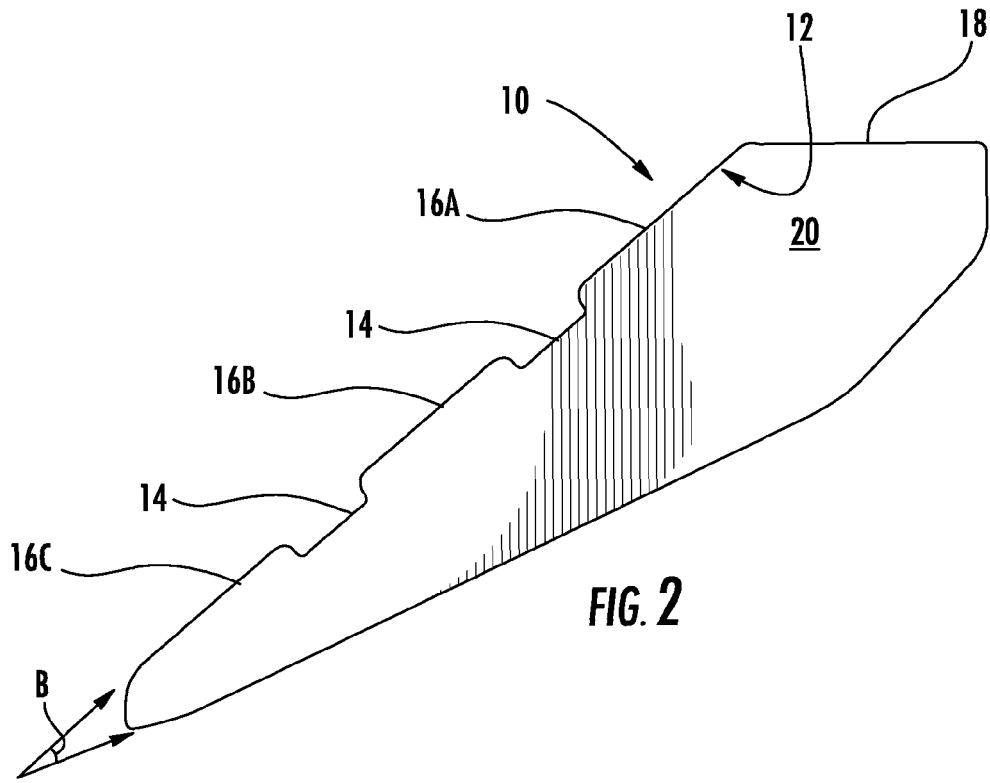
FIG. 2 is a side elevational view of the footrest assembly of FIG. 1.

Referring now to FIG. 1, the reference numeral 10 generally designates a footrest assembly for use in a vehicle interior. Specifically, the footrest assembly 10 is adapted to be disposed in a footwell of a vehicle compartment of a carryover vehicle, wherein the carry-over vehicle's architecture may be constrained due to the vehicle's park brake pedal geometry and the actuation swing of the park brake pedal. The footrest assembly 10 includes an upper contact surface 12 disposed at a predetermined angle relative to a vehicle floorboard, as indicated by angle B, "which is approximately at 40 degrees" shown in FIG. 2. The upper contact surface includes a generally planar surface 14 having a plurality of raised contact pads 16, identified as contact pads 16A, 16B and 16C in FIG. 1. The raised contact pads 16 provide a contoured or tractioned surface for contact surface 12 to better engage the shoe of a vehicle occupant in a slip-resistant manner. The footrest assembly 10 further includes a top wall 18 and a side wall 20 which are generally disposed in a perpendicular relationship to one another. While the footrest assembly 10 shows contact pads 16A, 16B and 16C disposed in a generally side-by-side spaced apart relationship, it is contemplated that a variety of configurations of contact pads can be used with the present invention without department from the spirit of the present invention.

Figure 3:
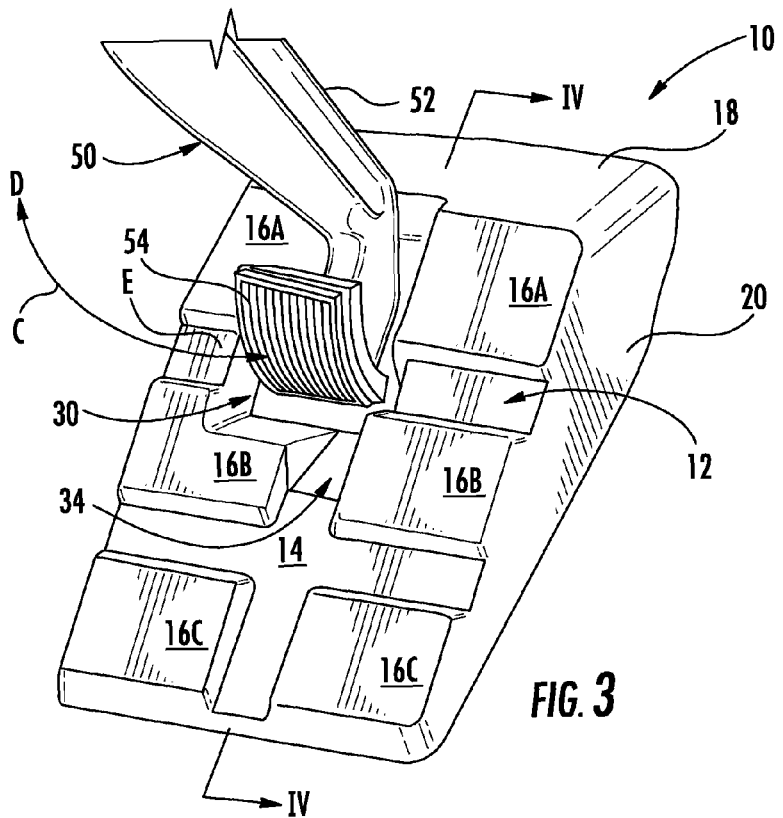
FIG. 3 is a front perspective view of the footrest assembly of FIG. 1, showing a nested parking brake pedal.

The footrest assembly 10 further includes a contoured depression or pocket 30 which, in assembly, is adapted to receive a parking brake pedal structure 50, as further shown in FIG. 3. The depression 30 can be referred to as a recess, a pocket, or a divot, as found throughout this disclosure. The contoured depression 30 includes a bottom wall 32 in fluid communication with a central angled surface 34. This configuration allows for water, snow, ice and other elements and debris to gravitationally feed down and out of the contoured depression 30, to the downwardly angled upper contact surface 12 in a direction as indicated by arrow A, such that the footrest assembly 10 provides for a self-draining design. A plurality of angled walls define the recess 30, wherein the angled walls are all configured to gravitationally expel debris and other elements from the recess 30, which will mainly be expelled via the central angled surface 34. Further, the depression 30 is surrounded by geometric detail, such as the raised contact pads 16A, 16B and 16C, which extend beyond the planar surface 14 and are designed to camouflage the contrast of the parking brake nest or depression 30. In this way, the depression 30 is at least partially camouflaged or concealed on the upper surface 12 of the footrest assembly 10, such that the vehicle occupant does not readily notice the depression 30 as compared to a depression disposed on a one-dimensional contact surface. Having the parking brake depression 30, the footrest assembly 10 can accommodate a parking brake pedal geometry and brake actuation constraints as further described below with reference to FIG. 3.

Referring now to FIG. 3, a parking brake pedal 50, such as an emergency brake pedal, is shown having a pedal portion 54 coupled to a brake arm 52. The brake pedal 50 is operable along a path as indicated by arrow C between an at-rest position D disposed generally over the footrest assembly 10, and an actuated position E shown in FIG. 3. Once in the actuated position E, the pedal portion 54 of the brake pedal 50 is disposed or nested within the depression 30 as found on the upper contact surface 12 of the footrest assembly 10. Thus, the footrest assembly 10 of the present invention can be installed in a vehicle where a standard footrest assembly would generally interfere with the actuation path C of brake pedal 50. With the nesting feature 30 incorporated into the footrest assembly 10 of the present invention, a brake pedal, such as brake pedal 50 shown in FIG. 3, can travel without constraint along actuation path C to the actuated position E, wherein the pedal portion 54 is nested within the depression 30 of the footrest assembly 10. Thus, optimal footrest positioning and optimal footrest plane angles can be achieved without compromise.

Figure 4:
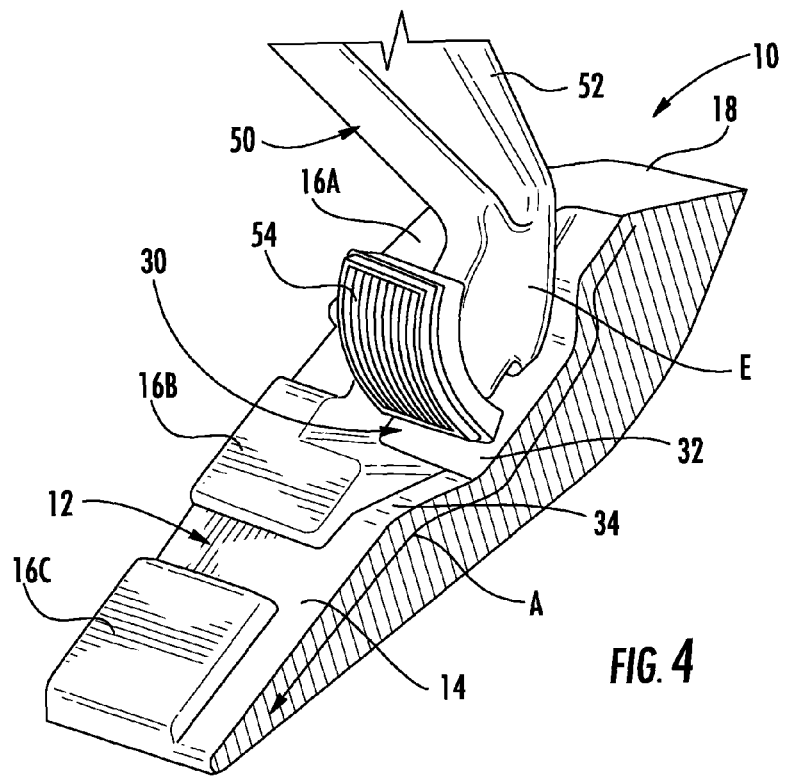
FIG. 4 is a cross-sectional perspective view of the footrest assembly of FIG. 3, taken at line IV of FIG. 3.
Figure 5:
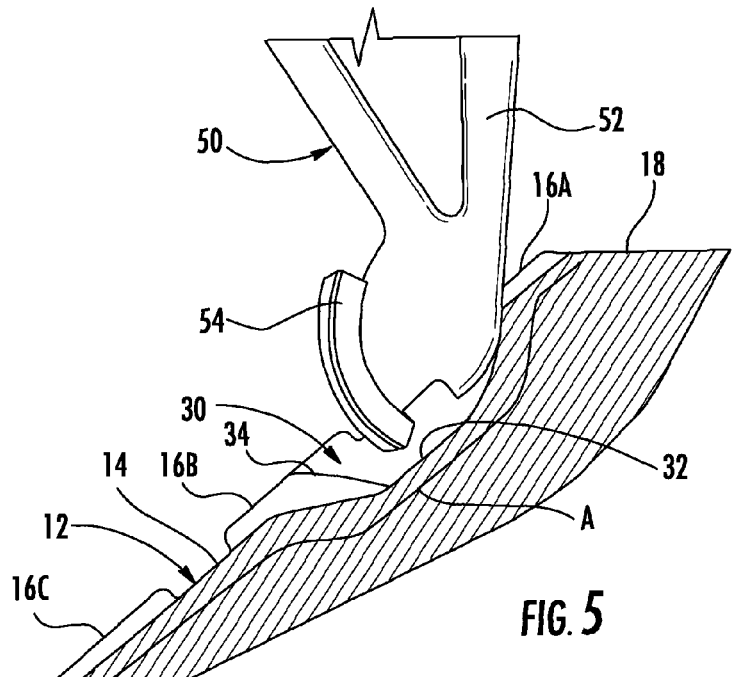
FIG. 5 is a cross-sectional side elevational view of the footrest assembly of FIG. 4.

Referring now to FIGS. 4 and 5, the drainage path A is generally shown as running along a length of the contact surface 12 through the divot or depression 30 for draining the footrest assembly 10 when debris or other material is deposited on the footrest assembly 10 in use. Thus, the geometric pattern as found on the upper contact surface 12 of the footrest assembly 10 is adapted to accommodate the flow of melted snow, slush, or other moisture that could be brought into the vehicle by the vehicle occupant's shoe.

Figure 6:
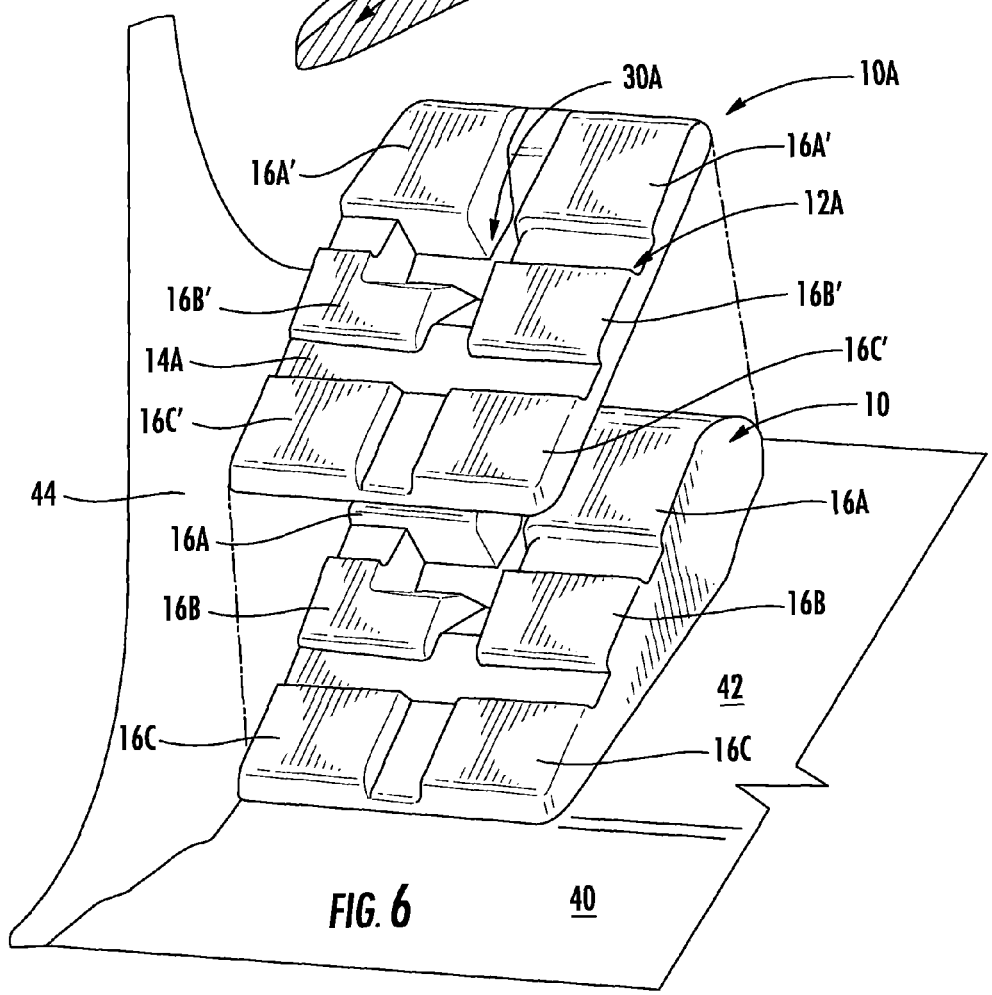
FIG. 6 is a front perspective view of a foot rest assembly, showing a footrest liner in an exploded view.

Referring now to FIG. 6, the footrest assembly 10 is shown having a liner member 10A adapted to be disposed on the upper contact surface 12 of the footrest assembly 10. As shown in FIG. 6, the liner member 10A includes corresponding features relative to the footrest assembly 10 that engage the contoured surface 12 of the footrest assembly 10 to hold the liner member 10A in place. These features include a recess 30A, disposed on an upper contact surface 12A having a generally planar portion 14A and contact pads 16A', 16B' and 16C'. Thus, the liner 10A is adapted to cover the contact surface 12 of the footrest assembly 10 in such a manner that the liner 10A is removable for cleaning or replacement as necessary. It is contemplated that the removable liner 10A may be comprised of a polymeric material providing for a gripping contact surface 12A, as well as flexible features for snap-fit coupling the liner member 10A to the contact surface 12 of the footrest assembly 10. Non-limiting examples of the polymeric material used to make up the liner 10A include thermoplastic polyolefin, polypropylene, polyethylene and blends thereof. Such polymeric materials are generally akin to materials used in cup holder liners and console liners, such that the liner member 10A would generally blend into the overall make up of a carry-over vehicle. Further, it is contemplated that the liner 10A can be used of a similar material as found on the pedal portion 54 of the parking brake 50 in an effort to coordinate the footrest assembly 10 into a vehicle interior. As further shown in FIG. 6, a vehicle floorboard 40 is provided having an angled surface 42 on which the footrest assembly 10 is disposed. In this environmental view, the footrest assembly 10 is disposed adjacent to a cowl trim assembly 44. Further, it is contemplated that the footrest assembly 10 can be an integrated component relative to the cowl trim assembly 44. In this way, the cowl trim 44 assembly can be installed in a vehicle interior with the footrest assembly 10 integrally molded as part of the cowl trim assembly 44. Thus, the cowl trim assembly 44 can use known attachment features as found in the vehicle interior for supporting the cowl trim assembly 44 on a sidewall of the vehicle compartment with the footrest assembly 10 supported on the vehicle floorboard 40, 42.

Figure 7:
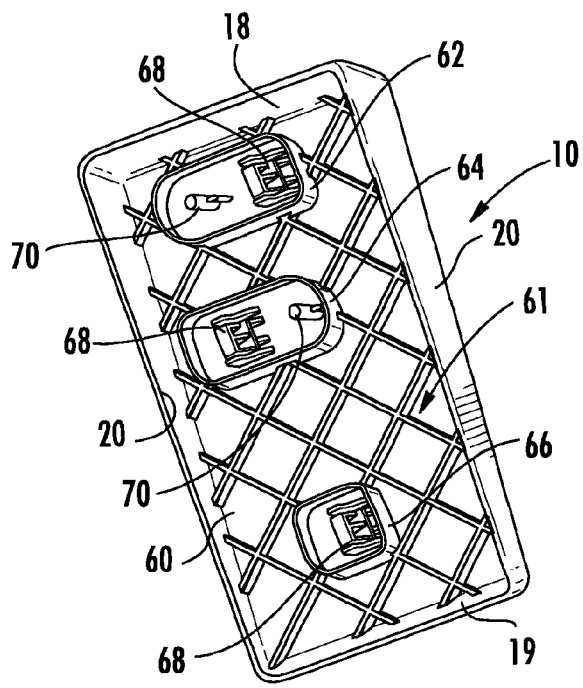
FIG. 7 is a bottom perspective view of the footrest assembly of FIG. 1.

Referring now to FIG. 7, the footrest assembly 10 is shown having a rear side 60 with a cavity portion 61 which houses attachment features 62, 64 and 66. The cavity portion 61 is defined by sidewalls 20, top wall 18, and front wall 19. The connecting features 62, 64 and 66 include clip members 68 for attaching the footrest assembly 10 to a base structure. Connecting features 62, 64 further include positioning elements 70 which are adapted to position the footrest assembly 10 on a base unit, in such a manner that the footrest assembly 10 is properly positioned on the base unit, as further described with reference to FIGS. 8-10.

Figure 8:
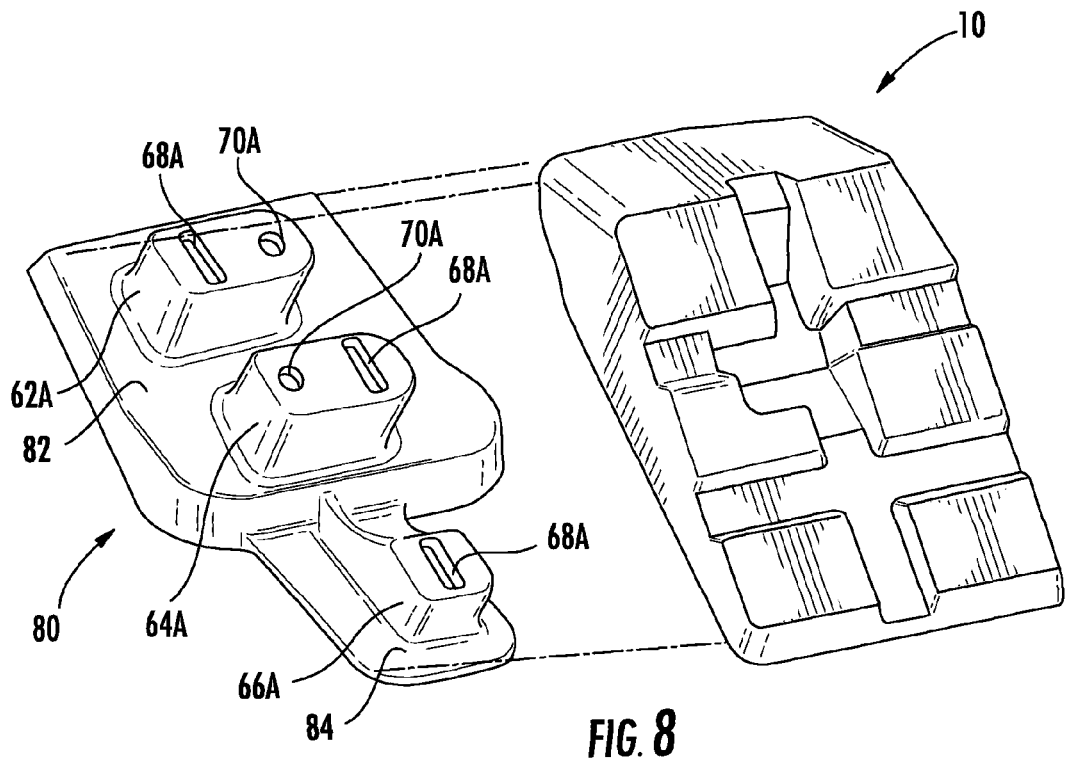
FIG. 8 is an exploded perspective view the footrest assembly of FIG. 1 and a base unit.
Figure 9:
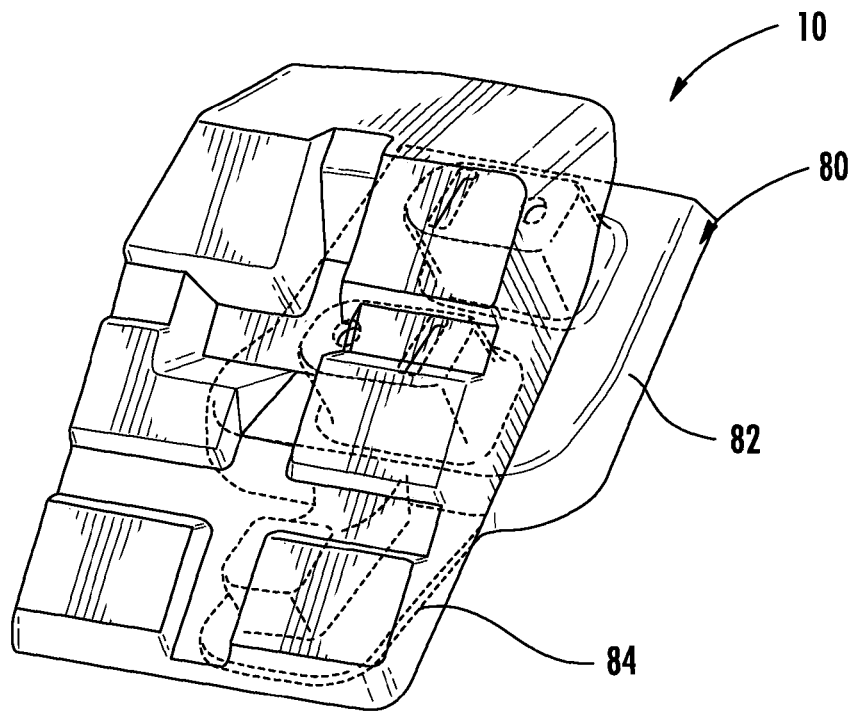
FIG. 9 is a perspective view of the footrest assembly of FIG. 8 as mounted to the base unit shown in phantom.

Referring now to FIG. 8, the footrest assembly 10 is shown exploded away from a base unit 80. The base unit 80 includes a body portion 82 with a flange 84 extending off a front portion thereof. The body portion 82 includes mounting features 62A and 64A which includes apertures 68A and 70A which are adapted to couple to the clip members 68 and positioning members 70 disposed on the underside 60 of the footrest assembly 10 in assembly, as shown in FIG. 9. The flange 84 further includes a mounting member 66A having aperture 68A which is adapted to couple to the clip 68 disposed on the lower connecting feature 66 of the footrest assembly 10. In this way, the mounting members 62A, 64A and 66A provide for secure attachment locations for the connecting members 62, 64 and 66 of the footrest assembly 10. It is contemplated that the base unit 80 can be heat stacked on a vehicle carpet or directly installed in a pocket on a vehicle carpet onto the vehicle floorboard 40 as further shown in FIG. 10.

Figure 10:
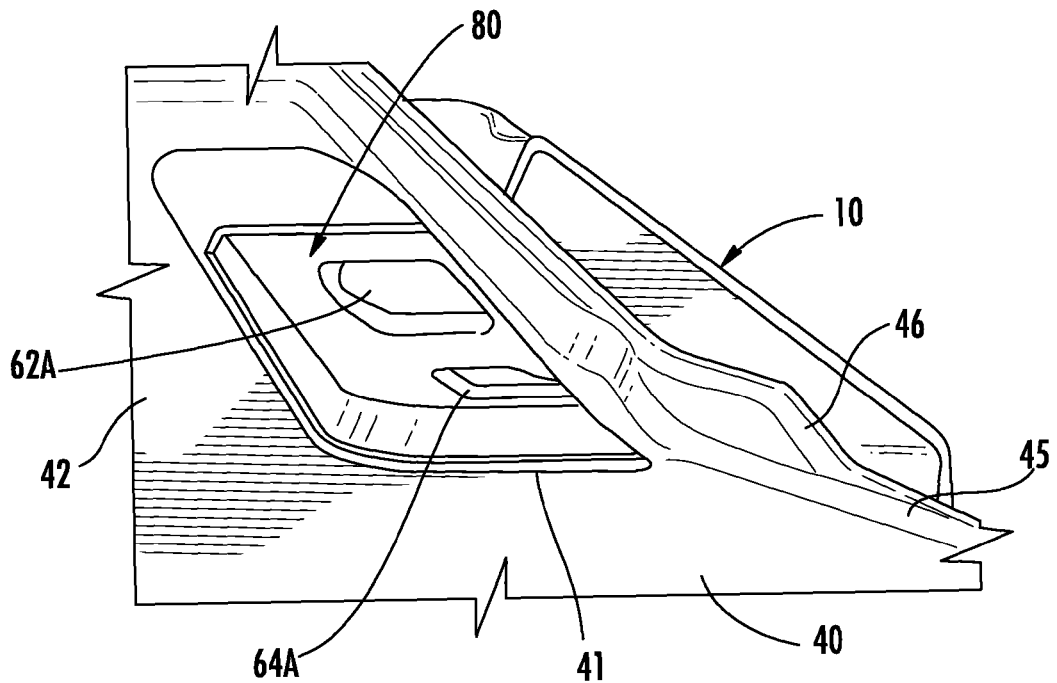
FIG. 10 is a bottom perspective view of the footrest assembly of FIG. 9 as mounted to the base unit on a vehicle floorboard.

As shown in FIG. 10, the base unit 80 functions as a mount or receiver for the footrest assembly 10, wherein the base unit 80 is mounted within a pocket or depression 41 formed in the insulation 45 of a vehicle floorboard 40, 42. The base unit 80 is adapted to be an under carpet base unit, wherein the base unit 80 is disposed under a carpet overlay 46 where three holes, or any number of holes necessary, would be formed in the carpet 46 to provide access to or expose the connecting members 62A, 64A and 66A. Thus, the footrest assembly 10 provides for a simple assembly and install process as used in carry-over vehicles.

Thus, the advantage of the footrest assembly 10 of the present invention is that it enables a footrest option to be placed within a carry-over vehicle interior in a vehicle compartment having an actuating park brake pedal. Previously, footrest assemblies were not permitted in such a vehicle compartment due to actuation constraints of the parking brake assembly.

It is to be understood that variations and modifications can be made on the aforementioned structure without departing from the concepts of the present invention, and further it is to be understood that such concepts are intended to be covered by the following claims unless these claims by their language expressly state otherwise.

We claim:

1. A footrest assembly for use in a vehicle compartment having a pedal-operated parking brake, comprising:
   an upper contact surface;
   a polymeric liner member removeably supported on the upper contact surface; and
   a recess disposed on the liner member, the recess defined by a plurality of angled walls configured to gravitationally drain debris from the recess, wherein the recess is adapted to receive a pedal portion of the pedal-operated parking brake in an actuated position.

2. The footrest assembly of claim 1, wherein, the upper contact surface further comprises a recess adapted to support the recess of the liner member.

3. The footrest assembly of claim 2, wherein, the liner member includes a contoured surface supported by a corresponding contoured surface of the upper contact surface, wherein the contoured surface of the liner member is adapted to partially conceal the recess as disposed on the liner member.

4. The footrest assembly of claim 3, wherein, the contoured surfaces of the liner member and the upper contact surface are defined by a plurality of raised contact pads.

5. The footrest assembly of claim 4, wherein, the liner member comprises a polymeric liner member.

6. The footrest assembly of claim 5, wherein, the liner member is adapted to snap-fit to the upper contact surface.

7. The footrest assembly of claim 6, including:
   one or more connecting members disposed on an underside of the upper contact surface; and
   a base unit adapted to couple to the floorboard having one or more mounting members, wherein the mounting members are adapted to align with and couple to the connecting members in assembly.

8. A footrest assembly for use in a vehicle compartment having a pedal-operated parking brake pivotally disposed above the footrest assembly, comprising:
   an upper contact surface having a recess disposed thereon, wherein the recess is configured to gravitationally expel debris therefrom;
   a polymeric liner member removeably supported on the upper contact surface;
   a plurality of raised contact pads adapted to at least partially conceal the recess; and
   wherein the recess is adapted to receive a pedal portion of the pedal-operated parking brake in an actuated position.

9. The footrest assembly of claim 8, including;
   a cowl trim assembly integrated with the footrest assembly, wherein the cowl trim assembly is adapted to support the footrest assembly as positioned on a vehicle floorboard.

10. The footrest assembly of claim 8, including:
    one or more connecting members disposed on an underside of the upper contact surface; and
    a base unit adapted to couple to the floorboard having one or more mounting members, wherein the mounting members are adapted to align with and couple to the connecting members in assembly.

11. The footrest assembly of claim 10, including;
    a liner member removeably supported on the upper contact surface.

* * * * *